United States Patent
Hwang et al.

(10) Patent No.: US 9,100,671 B2
(45) Date of Patent: Aug. 4, 2015

(54) APPARATUS AND METHOD FOR SUPPORTING VARIABLE LENGTH OF TRANSPORT PACKET IN VIDEO AND AUDIO COMMUNICATION SYSTEM

(75) Inventors: Sung-Hee Hwang, Gyeonggi-do (KR); Hak-Ju Lee, Incheon (KR); Se-Ho Myung, Gyeonggi-do (KR); Jin-Hee Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 231 days.

(21) Appl. No.: 13/343,544

(22) Filed: Jan. 4, 2012

(65) Prior Publication Data

US 2012/0170596 A1 Jul. 5, 2012

(30) Foreign Application Priority Data

Jan. 4, 2011 (KR) ........................ 10-2011-0000373

(51) Int. Cl.
- *H04J 3/16* (2006.01)
- *H04N 21/236* (2011.01)
- *H04L 29/06* (2006.01)
- *H04N 21/434* (2011.01)

(52) U.S. Cl.
CPC ........ *H04N 21/236* (2013.01); *H04L 29/06027* (2013.01); *H04L 65/602* (2013.01); *H04L 65/608* (2013.01); *H04N 21/434* (2013.01)

(58) Field of Classification Search
None
See application file for complete search history.

(56) References Cited

U.S. PATENT DOCUMENTS

| | | | |
|---|---|---|---|
| 6,801,544 B1 * | 10/2004 | Rijckaert et al. | 370/473 |
| 2002/0126710 A1 * | 9/2002 | Bergenwall et al. | 370/535 |
| 2008/0002765 A1 | 1/2008 | Song et al. | |
| 2008/0005776 A1 * | 1/2008 | VerSteeg et al. | 725/139 |
| 2009/0135849 A1 | 5/2009 | Alkove et al. | |
| 2011/0176061 A1 * | 7/2011 | Song et al. | 348/726 |
| 2012/0120969 A1 * | 5/2012 | Lee et al. | 370/471 |

FOREIGN PATENT DOCUMENTS

| | | |
|---|---|---|
| EP | 1 758 288 | 2/2007 |
| GB | 2 387 518 | 10/2003 |
| KR | 1020050008440 | 1/2005 |
| KR | 100529304 | 11/2005 |
| KR | 100758874 | 9/2007 |
| KR | 1020100138713 | 12/2010 |
| WO | WO 95/26595 | 10/1995 |

OTHER PUBLICATIONS

"Relation between MPEG-2 Transport Mux and ATM/AAL and Possible Candidates for AAL," Telecommunication Standardization Sector, Study Group 15, Experts Group for ATM Video Coding, ISO/IEC JTC1/SC29/WG11, MPEG93, Document AVC-524, Jul. 7, 1993.

* cited by examiner

*Primary Examiner* — Jutai Kao
(74) *Attorney, Agent, or Firm* — The Farrell Law Firm, P.C.

(57) ABSTRACT

Methods and apparatus are provided for supporting a variable-length transport packet in an Audio/Video (AV) communication system. Data to be transmitted is determined. It is determined whether a transport packet is the variable-length transport packet. A header having information indicating whether the transport packet is the variable-length transport packet is generated. When the transport packet is the variable-length transport packet, an optional header having length information of the transport packet is generated, and the data and the transport packet having the header and the optional header, are transmitted. When the transport packet is not the variable-length transport packet, the determined data and the transport packet having the header are transmitted.

20 Claims, 9 Drawing Sheets

|  | SYNTAX | NO. OF BITS | CONTENTS | | | |
|---|---|---|---|---|---|---|
|  |  |  | ATP #0 | ATP #1 | ATP #2 | ATP #3 |
| HEADER | SYNC | 7 | 0x23 | 0x23 | 0x23 | 0x23 |
|  | SYNC_START_FLAG | 1 | 1b | 1b | 1b | 1b |
|  | TRANSPORT_ERROR_INDICATOR | 1 | 0b | 0b | 0b | 0b |
|  | PAYLOAD_UNIT_START_INDICATOR | 1 | 1b | 1b | 1b | 1b |
|  | TRANSPORT_PRIORITY | 1 | 1b | 1b | 0b | 0b |
|  | PID | 13 | 0x0018 | 0x0019 | 0x0018 | 0x0019 |
|  | TRANSPORT_SCRAMBLING_CONTROL | 2 | 00b | 00b | 00b | 00b |
|  | ADAPTATION_FIELD_CONTROL | 2 | 00b | 00b | 00b | 00b |
|  | CONTINUITY_COUNTER | 4 | 0 | 0 | 1 | 1 |
|  | N_SP | 8 | 3 | 2 | 3 | 2 |
|  | S_LSP | 8 | 20 | 160 | 20 | 160 |
|  | AFC_ATP | 2 | 01b | 01b | 01b | 01b |
|  | SPBM | s | 000b | 00b | 000b | 00b |
| OPTIONAL HEADER | STUFFING BITS | 6-s | 000b | 0000b | 000b | 0000b |
|  | CRC | 8 |  |  |  |  |

FIG.5

APPARATUS AND METHOD FOR SUPPORTING VARIABLE LENGTH OF TRANSPORT PACKET IN VIDEO AND AUDIO COMMUNICATION SYSTEM

PRIORITY

This application claims priority under 35 U.S.C. §119(a) to a Korean patent application filed in the Korean Intellectual Property Office on Jan. 4, 2011 and assigned Serial No. 10-2011-0000373, the entire disclosure of which is incorporated herein by reference.

BACKGROUND OF THE INVENTION

1. Field of the Invention

The present invention relates generally to an Audio/Video (AV) communication system, and more particularly, to supporting transport packets in the AV communication system.

2. Description of the Related Art

A Moving Picture Experts Group 2-Transport Stream (MPEG2-TS) packet transmits AV broadcasting data in an AV communication system.

FIG. 1 is a diagram illustrating a structure of an MPEG2-TS packet. Referring to FIG. 1, the MPEG2-TS packet includes a 1-byte sync signal 110, a 3-byte header 120, and a 184-byte adaptation field/payload 130. Therefore, the MPEG2-TS packet has a fixed length of 188 bytes.

Due to the introduction of high-definition content such as, for example, 3-Dimensional (3D) content and Ultra Definition (UD) content, the AV communication system requires high-speed data transmission. However, as shown in FIG. 1, since the conventional MPEG2-TS packet has a fixed length, it is ineffective to use the packet in high-speed data transmission. Specifically, transmission efficiency decreases because the conventional MPEG2-TS packet requires 4-byte header information in each 184-byte payload. Data transmission efficiency further decreases when there is a need to transmit data having a size less than 184 bytes.

SUMMARY OF THE INVENTION

The present invention has been made to address at least the above problems and/or disadvantages and to provide at least the advantages described below. Accordingly, an aspect of the present invention provides a method and an apparatus for supporting a variable-length packet in an AV communication system.

Another aspect of the present invention provides a method and an apparatus for supporting a transport packet having a structure compatible with the MPEG2-TS packet in a AV communication system.

An additional aspect of the present invention provides a method and an apparatus for configuring a variable-length transport packet in a transmitter of an AV communication system.

A further aspect of the present invention provides a method and an apparatus for analyzing a variable-length transport packet in a receiver of an AV communication system.

In accordance with an aspect of the present invention, a method is provided for supporting a variable-length transport packet in a transmitter of an AV communication system. Data to be transmitted is determined. It is determined whether a transport packet is the variable-length transport packet. A header having information indicating whether the transport packet is the variable-length transport packet is generated. When the transport packet is the variable-length transport packet, an optional header having length information of the transport packet is generated, and the data and the transport packet having the header and the optional header, are transmitted. When the transport packet is not the variable-length transport packet, the determined data and the transport packet having the header are transmitted.

In accordance with another aspect of the present invention, a method for supporting a variable-length transport packet in a receiver of an AV communication system is provided. A transport packet is received from a transmitter. It is determined whether the transport packet is the variable-length transport packet by analyzing a header of the transport packet. When the transport packet is the variable-length transport packet, length information of the transport packet is acquired from an optional header included in the transport packet. At least one of an audio stream, a video stream and a data stream is extracted from the transport packet.

In accordance with another aspect of the present invention, an apparatus is provided for supporting a variable-length transport packet in a transmitter of an AV communication system. The apparatus includes a multiplexer (MUX) for determining data to be transmitted, determining whether a transport packet is the variable-length transport packet, generating a header comprising information indicating whether the transport packet is the variable-length transport packet, generating an optional header comprising length information of the transport packet when the transport packet is the variable-length transport packet. The apparatus also includes a transmitter for transmitting the determined data and the transport packet comprising the header and the optional header when the transport packet is the variable-length transport packet, and transmitting the determined data and the transport packet comprising the header when the transport packet is not the variable-length transport packet.

In accordance with another aspect of the present invention, an apparatus for supporting a variable-length transport packet in a receiver of a video/audio communication system is provided. The apparatus includes a receiver for receiving a transport packet from a transmitter. The apparatus also includes a demultiplexer (DEMUX) for determining whether the transport packet is the variable-length transport packet by analyzing a header of the transport packet, acquiring length information of the transport packet from an optional header included in the transport packet when the transport packet is the variable-length transport packet, and extracting at least one of an audio stream, a video stream and a data stream from the transport packet.

BRIEF DESCRIPTION OF THE DRAWINGS

The above and other aspects, features and advantages of the present invention will be more apparent from the following detailed description when taken in conjunction with the accompanying drawings, in which:

FIG. 5 is a diagram illustrating a detailed configuration of a transport packet header in an AV communication system, according to an embodiment of the present invention;

DETAILED DESCRIPTION OF EMBODIMENTS OF THE PRESENT INVENTION

Figure 1:
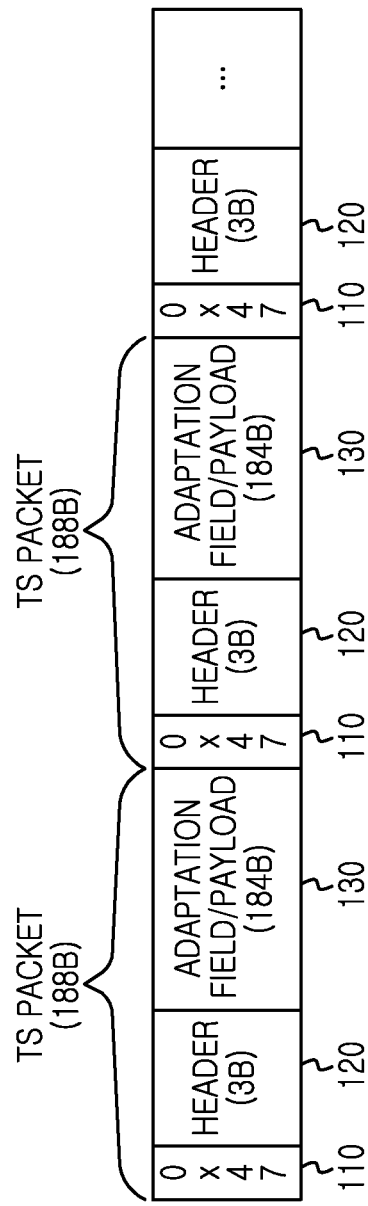
FIG. 1 is a diagram illustrating a structure of a MPEG2-TS packet.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention relate to a method and an apparatus for supporting a variable-length packet in an AV communication system.

A transport packet configuration is described in detail below with reference to FIG. 2.

Figure 2:
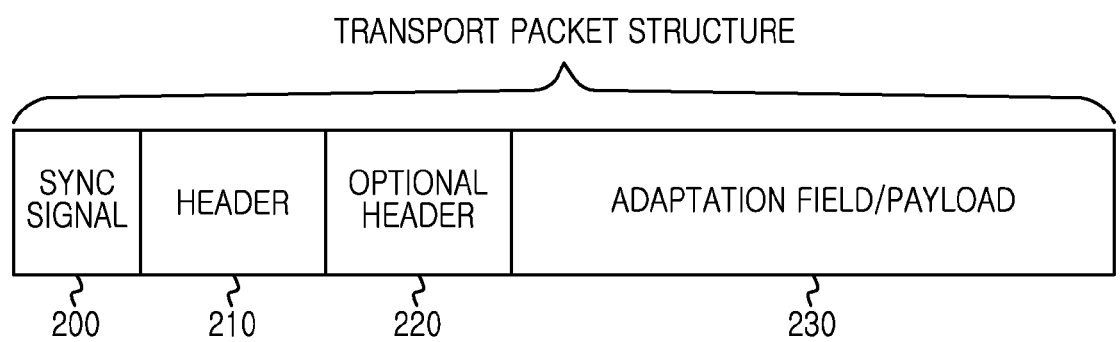
FIG. 2 is a diagram illustrating a transport packet configuration in an AV communication system, according to an embodiment of the present invention.

FIG. 2 is a diagram illustrating a transport packet configuration in an AV communication system, according to an embodiment of the present invention.

Referring to FIG. 2, a transport packet includes a sync signal 200, a header 210, an optional header 220, and an adaptation field/payload 230. Although the sync signal 200 and the header 210 are separately illustrated herein for clarity of explanation, the sync signal 200 can be included in the header 210. In addition, the transport packet can include a secondary sync signal between the header 210 and the optional signal 220, between the optional header 220 and the adaptation field/payload 230, or in the middle of the adaptation field/payload 230. The inclusion of the secondary sync signal is described in detail below with reference to FIGS. 3A to 3D.

The sync signal 220 is a signal that represents a start position of the transport packet. The sync signal 220 can be set to a value of 0x47, for example, or can be set to another value by a designer.

The header 210 has the same structure as that of the MPEG2-TS packet, as shown in Table 1 below. According to embodiments of the present invention, adaptation field control information is used to indicate whether the transport packet is the MPEG2-TS packet or a variable-length transport packet.

TABLE 1

| Field Name | Number of bits |
|---|---|
| sync_byte | 8 |
| transport_error_indicator | 1 |
| payload_unit_start_indicator | 1 |
| transport_priority | 1 |
| PID | 13 |

TABLE 1-continued

| Field Name | Number of bits |
|---|---|
| transport_scrambling_control | 2 |
| adaptation_field_control | 2 |
| continuity_counter | 4 |

The sync_byte indicates a sync signal that represents a start position of the transport packet. The transport_error_indicator indicates whether there are one or more bit errors in the transport packet. The payload_unit_start_indicator indicates a start position of a payload. In addition, the transport_priority indicates a priority of the transport packet. The PID (Packet IDentifier) indicates an IDentifier (ID) of the transport packet. The transport_scrambling_control indicates whether the transport packet is scrambled. The adaptation_field_control indicates whether the header is followed by the adaptation field/payload. The continuity_counter indicates an order of the transport packet in continuous transport streams.

Information of the transport_error_indicator (hereinafter, TEI) field and the adaptation_field_control (hereinafter, AFC) field in the header 210 can be controlled to support the variable-length transport packet, according to embodiments of the present invention.

The AFC field can be defined in the MPEG2-TS packet as shown in Table 2 below.

TABLE 2

| values | Description |
|---|---|
| 00 | Reserved for future use by ISO/IEC |
| 01 | No adaptation_field, payload only |
| 10 | Adaptation_field only, no payload |
| 11 | Adaptation_field followed by payload |

In the AFC field, '00' denotes a value reserved for future use, '01' denotes that a header is followed by only a payload, '10' denotes that the header is followed by only an adaptation field, and '11' denotes that the header is followed by both the adaptation field and the payload.

Thus, since the value '00' is typically not used in the conventional AFC field, embodiments of the present invention use the value '00' to indicate that a transport packet is a variable-length transport packet.

TABLE 3

| values | Description |
|---|---|
| 00 | Advanced Transport Packet Indicator |
| 01 | No adaptation_field, payload only |
| 10 | Adaptation_field only, no payload |
| 11 | Adaptation_field followed by payload |

As shown in Table 3 above, in the AFC field of embodiments of the present invention, '00' denotes that a transport packet is a variable-length transport packet, '01' denotes that a header is followed by only a payload, '10' denotes that the header is followed by only an adaptation field, and '11' denotes that the header is followed by both the adaptation field and the payload.

Embodiments of the present invention define an AFC field value as shown in Table 3 above. Thus, a receiving apparatus that does not support the variable-length transport packet may discard the transport packet when the AFC field value is set to '00', and may operate in a conventional manner when the AFC field value is set to another value other than '00'. Specifically, since the variable-length transport packet is indicated through the AFC field, embodiments of the present invention may also apply to the conventional receiving apparatus without an error. Thus, a transmitting apparatus of embodiments of the present invention may transmit data by using the conventional transport packet in consideration of compatibility with the conventional receiving apparatus.

The TEI field shown in Table 1 indicates whether there are one or more bit errors in the transport packet. Specifically, when the TEI field has a value of '0', it indicates that the transport packet has no bit error, and when the TEI field has a value of '1', it indicates that the transport packet has a bit error. However, the value of the TEI field may be always set to '0' in the variable-length transport packet, according to embodiments of the present invention. By always setting the TEI field to '0', it avoids a situation in which, when the AFC field is set to '00' and the TEI field is set to '1', the conventional receiving apparatus recognizes the value '00' of the AFC field as an error. Specifically, the receiving apparatus acquires synchronization of the received transport packet and thereafter determines whether an error exists in the packet by using the TEI field value. By setting the TEI field value to '1', the processing a transport packet is avoided, by recognizing the AFC field value '00' as an error if the TEI field value is '1'. A bit error status may also be indicated without having to set the TEI field to '0' in the variable-length transport packet, according to embodiments of the present invention.

If the AFC field value of the header 210 is set to '00', the header 210 is followed by the optional header 220. The optional header 220 includes information indicating a length of the transport packet and information necessary to decode the transport packet. Specifically, the optional header 220 may include at least one of length information of the transport packet, information on the adaptation field/payload 230, an order of the transport packet, a Cyclic Redundancy Check (CRC) checking status, a Forward Error Correction (FEC) success status, a length of the optional header 220, error information for each split region, and CRC information. According to this configuration, when transport packets are input as a continuous stream, the receiver is able to determine a location of a sync signal that represents a start position of a next transport packet by using the sync signal 200 and the transport packet's length information included in the optional header 220. Thus, the receiver is able to identify each transport packet.

The optional header 220 may have a fixed length or a variable length.

When the optional header 220 has a fixed length, it may be configured as shown in Table 4 below.

TABLE 4

| Syntax | Definition |
| --- | --- |
| Adaptation Field control for Advanced Transport Packet (AFC_ATP) | This Field indicates whether this ATP header is followed by an adaptation field and/or payload |
| Continuity Counter for ATP (CC_ATP) | This field increment with each ATP with the same PID and wraps around to 0 after its maximum value. |
| CRC Flag | This field indicate whether all or some portion of this ATP has been checked by CRC |
| FEC Status Flag | This field indicates whether FEC(s) including this ATP is failure. |

TABLE 4-continued

| Syntax | Definition |
| --- | --- |
| The size of ATP (S_ATP) | This field specifies the size in n-bits in this ATP |
| CRC | Cycle Redundancy Check for this ATP Header |

In Table 4, Adaptation Field control for Advanced Transport Packet (AFC_ATP) consists of 2 bits, and indicates whether the optional header is followed by the adaptation field/payload 203. Specifically, the AFC_APT field can be set to '01' to indicate that the header is followed by only the payload, '10' to indicate that the header is followed by only the adaptation field, and '11' to indicate that the header is followed by both the adaptation field and the payload. As shown in Table 1, even if the header 210 includes the AFC field that indicates whether the header is followed by the adaptation field/payload, the optional header 220 includes the AFC_ATP because the AFC field included in the header 210 is set to '00' in the variable-length transport packet. Thus, the AFC field included in the header 210 it is able to indicate whether the header is followed by the adaptation field/payload 230.

Continuity Counter for ATP (CC_ATP) consists of 4 bits, and indicates an order of the transport packet in the continuous transport stream.

CRC Flag consists of 1 bit, and indicates a CRC checking status. Specifically, the CRC Flag indicates whether information indicating an error status of the TEI field included in the header 210 is information acquired by using CRC checking or information acquired by using another factor other than CRC checking. For example, the CRC Flag can indicate that the information indicating the error status of the TEI field is information acquired by an FEC error correction result. The CRC Flag is information different from CRC, and may have a more significant meaning when there is no CRC field in comparison with a case where the CRC field does not exist in the optional header 220 as shown in Table 4 above. In addition, since the TEI can indicate an error status for all portions of the transport packet or can indicate an error status for some portions of the transport packet, the CRC Flag can also indicate whether all or some portions of the transport packet are checked by CRC.

FEC Status Flag indicates a success/failure status of FEC error correction. Specifically, the FEC Status Flag indicates the success/failure status of the FEC error connection for a region indicated by the TEI field included in the header 210. If the region indicated by the TEI field corresponds to two or more FECs, the FEC Status Flag indicates an error correction success when an error is corrected for all of the two or more FECs, and indicates an error correction failure when an error correction fails in any one of the two or more FECs. Herein, when the FEC Status Flag indicates that the error correction is successful and the TEI indicates that a bit error exists, it can be interpreted such that the FEC error correction is performed, and the error is detected as a result of CRC checking. On the contrary, when the FEC Status Flag indicates that the error correction fails and the TEI indicates that there is no bit error, it can be interpreted such that the FEC error connection fails, but there is no error in a region indicated by the TEI or the error is corrected. If the TEI of the header 210 is always set to '1' to indicate the variable-length transport packet, the optional header 220 can include the TEI field that indicates whether there are one or more bit errors in the transport packet instead of the FEC Status Flag.

The S_ATP indicates a size of ATP. The S_ATP consists of 16 bits, and indicates the number of bytes (when n=8) in the transport packet. Thus, the S_ATP can indicate a total length of the transport packet and a start position of a next transport packet. If the length of the transport packet is limited to a multiple of 32 bytes, a multiple of 47 bytes, or a multiple of 64 bytes, for example, the definition on the S_ATP can also be changed to n=32*8, n=8*47 or 64*8. Since the transport packet length is limited to a multiple of a specific length, when a transport packet having a minimum length is continuously input to the receiver, the receiving apparatus can find a start sync signal of each transport packet by utilizing a fact that the start sync signal of the transport packet is input with a period corresponding to at least the minimum length.

CRC consists of 8 bits, and is used to detect an error in the header 220 and the optional header 230 of the transport packet. In addition, when the same value as the start sync signal is detected from the transport packet, if there is no error as a result of CRC checking from a position where that value is detected to a position at which the CRC is expected to be allocated, there is a high probability that the position at which that value is detected is a position of the start sync signal. Therefore, sync detection performance can be improved.

On the other hand, when having a variable length, the optional header 220 can be configured as shown in Table 5 below.

TABLE 5

| Syntax | Definition |
| --- | --- |
| The number of sub-packets (N_SP) | This field specifies the number of sub-packets in this ATP |
| Size of the last sub-packet (S_LSP) | This field specifies the size in m-bits of the last sub-packet |
| Adaptation field control for ATP (AFC_ATP) | This field indicates whether this ATP header is followed by an adaptation field and/or payload |
| Error indicating bit-map for sub-packets (SPBM) | This field specifies the error status of each sub-packet as a bitmap |
| Stuffing bits | This k-bits field is allocated to make length of this ATP Header be multiple of 8-bits (0 ≤ s < 8, integer) |
| CRC | Cycle Redundancy Check for this ATP Header |

In Table 5, N_SP consists of 8 bits, and indicates the Number (N) of Sub-Packets (SPs) included in the transport packet. Specifically, the number of sub-packets included in the transport packet can be acquired by adding '1' to a value that is set to the N_SP field. Up to 256 sub-packets can be indicated. If the transport packet has a length greater than or equal to a specific value, the sub-packet implies a packet acquired by splitting the transport packet into at least two or more packets including the header and the optional header. Each sub-packet may have the same or a different length. If the transport packet is split into (k+1) sub-packets, each sub-packet length can be defined such that a length of a first sub-packet is N1 bits, a length of a second sub-packet is N2 bits, and a length of a $K^{th}$ sub-packet is Nk bits, where N1=N2= . . . =Nk. A length of a last sub-packet, that is, an $(Nk+1)^{th}$ sub-packet, is determined by a total length of the transport packet. In addition, the sub-packet may be a unit for indicating an error or a unit for inserting a secondary sync signal. The unit for indicating the error may be equal to the unit for inserting the secondary sync signal.

S_LSP consists of 8 bits, and indicates the number of bytes (when m=8) of a Last Sub-Packet (LSP) included in the transport packet. The number of bytes of the last sub-packet can be determined by adding 1 to a value that is set in the S_LSP field. When the variable-length transport packet is split into a plurality of sub-packets, a length of a last sub-packet can change depending on the length of the transport packet. Thus, it is necessary to indicate the length of the last sub-packet. If there is a restriction on the length of the transport packet, the meaning indicated by the S_LSP can also change according to the restriction on the length of the transport packet. Specifically, the purpose of using the S_LSP is to know the length of the last sub-packet included in each transport packet in order to conform to the specification of the transport packet.

The total length of the transport packet can be determined by using the N_SP and the S_LSP, and it is also possible to know when a next transport packet will start on a continuous transport stream. For example, if the N_SP is 0x0F and the S_LSP is 0x0F, in a situation where sub-packets have the same length of 256 bytes, it can be determined that the total packet length is 4112 (i.e., 256*16+16) bytes.

AFC_ATP consists of 2 bits, and indicates whether the optional header is followed by the adaptation field/payload 230. Specifically, the AFC_APT field can be set to '01' to indicate that the header is followed by only the payload, '10' to indicate that the header is followed by only the adaptation field, and '11' to indicate that the header is followed by both the adaptation field and the payload. As shown in Table 1 above, the optional header 220 includes the AFC_ATP because the AFC field included in the header 210 is set to '00' in the variable-length transport packet, and thus, it is not possible to indicate whether the header is followed by the adaptation field/payload 230.

SPBM indicates an error status for sub-packets as a bitmap. The SPBM is a field in which the number of bits is determined based on a value n that is set to the N_SP. SPBM indicates an error status of each sub-packet included in the transport packet. In particular, the error status of each sub-packet can be indicated in such a manner that, if TEI which is a very next bit of the start sync signal is always set to '0', the SPBM is configured with (n+1) bits and is one-to-one mapped starting from a first sub-packet of the transport packet. Otherwise, the SPBM is configured with n bits and is one-to-one mapped starting from a second sub-packet of the transport packet (where 0≤n<256).

The stuffing-bits field is an optional field for making the length of the header 210 and the optional header 220 a multiple of 8 bits, that is, a byte unit, and may have a size of 0≤s<8. For example, when a remainder obtained after dividing N by 8 is denoted by remainder(N,8), if remainder (p,8)=0, then s=0, and if remainder(p,8)≠0, then s=8−remainder(p,8). In this case, p denotes the number of bits of the header 210 and the optional header 220 other than stuffing bits.

CRC consists of 8 bits, and is used to detect an error in the header 220 and the optional header 230 of the transport packet. In addition, when the same value as the start sync signal is detected from the transport packet, if there is no error as a result of CRC checking from a position at which that value is detected to a position at which the CRC is expected to be allocated, there is a high probability that the position at which that value is detected is a position of the start sync signal. Therefore, sync detection performance can be improved.

The adaptation field/payload 230 includes at least one of an adaptation field including additional information and a payload indicating AV data to be transmitted, as shown in the AFC_ATP field of the optional header 220.

As described above with reference to FIG. 2, the transport packet of embodiments of the present invention includes the sync signal 200, the header 210, the optional header 220, and the adaptation field/payload 230. In order to facilitate sync acquisition in the receiver, the transport packet includes a secondary sync signal according to the length of the transport packet, as shown in FIGS. 3A to 3D.

FIGS. 3A to 3D are diagrams illustrating insertion of a sync signal into a transport packet in an AV communication system, according to an embodiment of the present invention.

Referring to FIGS. 3A to 3D, if a length of the transport packet exceeds a threshold length, in addition to the sync signal inserted to a start position of the transport packet, a secondary sync signal can be inserted at the middle of the packet. If the length of the transport packet is less than or equal to the threshold length, the sync signal can be inserted only at the start position of the transport packet.

Figure 3A:
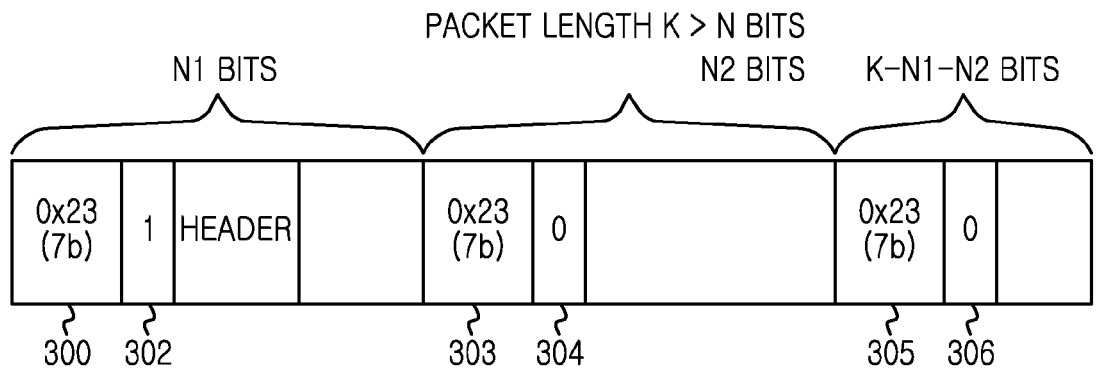
FIGS. 3A to 3D are diagrams illustrating insertion of a sync signal into a transport packet in an AV communication system, according to an embodiment of the present invention.

In accordance with FIG. 3A a start sync signal and a secondary sync signal are identified by using a last bit of a sync signal when a transport packet includes the start sync signal and the secondary sync signal. Specifically, in FIG. 3A, 7-bit sync signals 300, 303, and 305 and 1-bit sync-start_flags 302, 304, and 306 are provided. The 7-bit sync signals 300, 303, and 305 are equally set to 0x23 for each sub-packet. A determination as to whether the sync signal is the start sync signal or the secondary sync signal is performed using the 1-bit sync-start_flags 302, 304, and 306. If the sync signal is the start sync signal that represents a start position of the transport packet, the sync_start_flag is set to 1 (as shown at the 1-bit sync-start flag 302), and if the sync signal is the secondary sync signal, the sync_start_flag is set to 0 (as shown at 1-bit sync-start flags 304 and 306). FIG. 3A can be applicable to MPEG2-TS packet configuration since when considering both the 7-bit sync signals 300, 303, and 305 and the 1-bit sync_start_flags 302, 304, and 306, the value of the start sync signal is 0x47 and the value of the remaining secondary sync signal is 0x46, and thus, the value of the start sync signal cannot have the same value as that of the case shown in FIG. 3D.

Figure 3B:
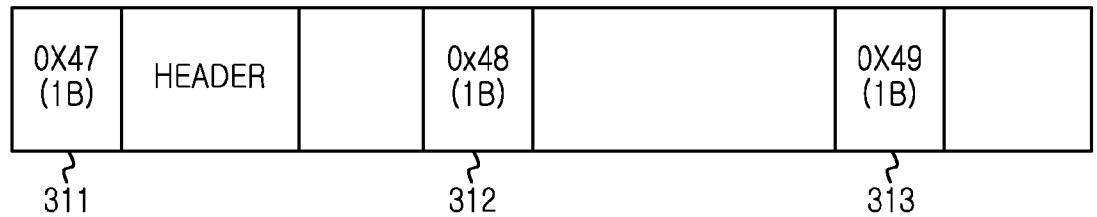

In accordance with FIG. 3B, a start sync signal and a secondary sync signal are identified based on a value of a sync signal included in each sub-packet when a transport packet includes the start sync signal and the secondary sync signal. Specifically, in FIG. 3B, the value of the sync signal included in each sub-packet can be gradually increased (i.e., 0x47, 0x48, 0x49) to identify a start sync signal 311 and secondary sync signals 312 and 313. A position of the start sync signal of the transport packet can be indicated from a currently detected sync signal. The value of the sync signal included in the sub-packet can be gradually decreased to identify the start sync signal and the secondary sync signal.

Figure 3C:
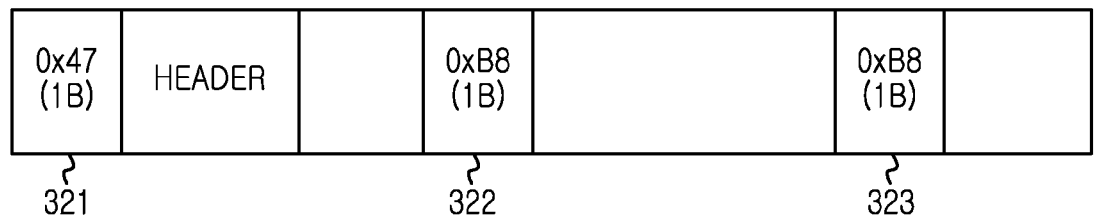

In accordance with FIG. 3C, a start sync signal 321 and secondary sync signals 322 and 323 are identified by setting values of the secondary sync signals 322 and 323 to a value (i.e., 0xB8) inverted from a value (i.e., 0x47) of the start sync signal when a transport packet includes the start sync signal and the secondary sync signal.

Figure 3D:
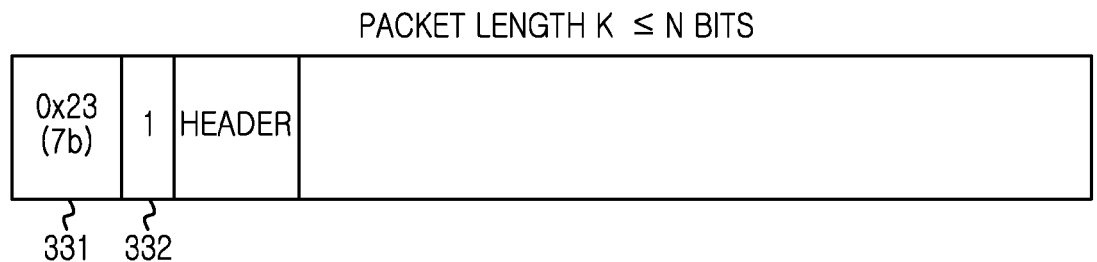

In accordance with FIG. 3D, only a start sync signal is included, when a length of a transport packet is less than or equal to a threshold length. The start sync signal can consist of a 7-bit sync signal 331 and a 1-bit sync_start_flag 332 similarly to FIG. 3A. The sync signal 331 can be set to 0x23 and the sync_start_flag 332 can be set to 1. Specifically, an 8-bit value corresponding to the sync signal 331 and the sync_start_flag 332 has the same value as 0x47, i.e., the sync signal value of the MPEG2-TS packet. Thus, the variable transport packet includes the MPEG2-TS packet configuration so that data can be transmitted in a transmitter with the MPEG2-TS packet configuration.

Figure 4:
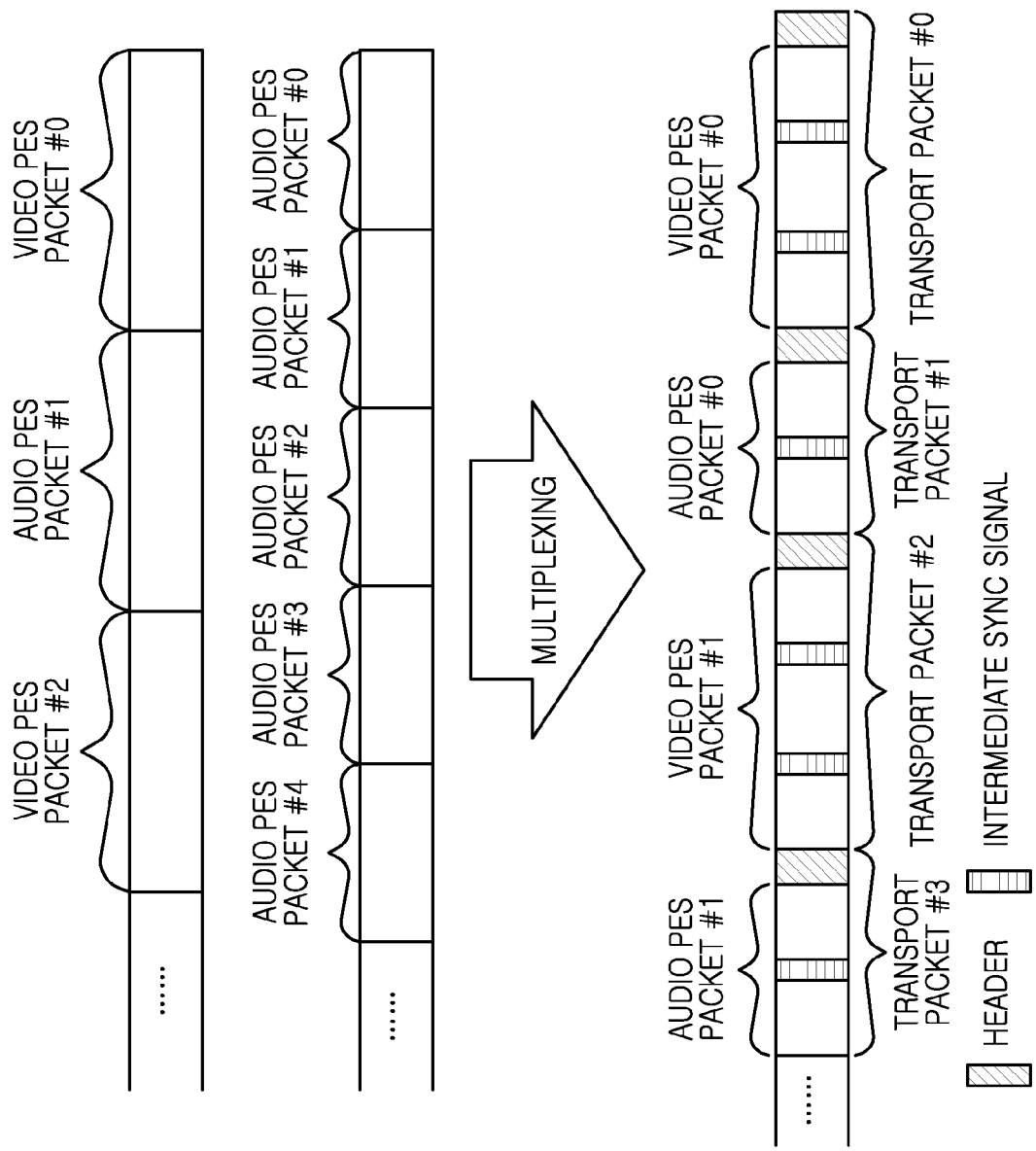
FIG. 4 is a diagram illustrating a process of generating a transport packet in an AV communication system, according to an embodiment of the present invention.

FIG. 4 is a diagram illustrating a process of generating a transport packet in an AV communication system, according to an embodiment of the present invention.

Referring to FIG. 4, a video stream is processed in a format of a video Packetized Elementary Stream (PES) packet, and an audio stream is processed in a format of an audio PES packet. The PES packet is packetized in a specific unit for the purpose of storage or transmission.

The processed video PES packets and audio PES packets are converted into transport packets having the structure of FIG. 2 via multiplexing. In particular, through multiplexing, a TEI field of a header of each transport packet is set to '0' and an AFC field is set to '00', so as to indicate that the transport packet is a variable-length transport packet. In addition, through multiplexing, the transport packet is configured to include information indicating a length of the transport packet and information required to decode the transport packet as shown in Table 4 or Table 5 above. A length of the transport packet is determined according to a size of each of the video PES packets and each of the audio PES packets. Specifically, as shown in FIG. 4, a length of a transport packet #0 includes a video PES packet #0, a length of a transport packet #1 includes an audio PES packet #0, a length of a transport packet #2 includes a video PES packet #1, and a length of a transport packet #3 includes an audio PES packet #1.

In addition, through multiplexing, transport packets having a length that exceeds a threshold length can be configured to include at least one secondary, or intermediate, sync signal in addition to a start sync signal as shown in FIG. 3A to FIG. 3C.

A method of configuring a sync signal, a header, and an optional header for each transport packet is described in detail when the transport packets #0, #1, #2, and #3 are generated by processing the video PES packets #0 and #1 and video PES packets #0 and #1 of FIG. 4.

FIG. 5 is a diagram illustrating a detailed configuration of a transport packet header in an AV communication system, according to an embodiment of the present invention.

Referring to FIG. 5, values that are set to a sync signal, a header, and an optional header of each of transport packets #0, #1, #2, and #3 are shown when a transport packet is split into 256-byte sub-packets. It is assumed that each of the video PES packets has a length of 522 bytes, and that each of the audio PES packets has a length of 407 bytes. The header including the sync signal has a size of 4 bytes, and the optional header has a size of 4 bytes. In addition, as shown in Table 5, it is also assumed herein that the optional header has a variable length.

Regarding the header, a 7-bit sync signal (i.e., Sync) of each transport packet is set to '0x23', and a 1-bit sync_start_flag is set to '1'. Thus, a total of an 8-bit value is 0x47.

In addition, TEI of the header is set to '0' for all transport packets so that the transport packet can be discarded when a conventional receiving apparatus receives the variable transport packet.

Payload_unit_start_indicator of the header is set to '1' for all transport packets to indicate that a payload of each transport packet starts with a first byte of a PES packet.

Transport_priority of the header is set to '1' for the transport packets #0 and #1, and is set to '0' for the transport packets #2 and #3 to differentiate start PES packets of the transport stream and other PES packets.

PID of the header is set to '0x0018' for a transport packet including a video PES packet, and is set to '0x0019' for a transport packet including an audio PES packet.

Transport_scrambling_control of the header is set to '00b' for all transport packets to indicate 'Not scrambled'.

Adaptation_field_control (AFC) of the header is set to '00b' for all transport packets to indicate that the transport packet is a variable-length transport packet.

Countinuity_counter of the header is set to '0' for a transport packet #0 including a first video PES packet and a transport packet #1 including a first audio PES packet, and is set to '1' for the remaining transport packets #2 and #3.

Regarding the optional header, N_SP is set to '3' for transport packets #0 and #2 including a video PES packet to indicate that the transport packet is split into three sub-packets, and is set to '2' for transport packets #1 and #3 including an audio PES packet to indicate that the transport packet is split into two sub-packets.

S_LSP of the optional header is set to '20' for transport packets #0 and #2 including a video PES packet to indicate that a last sub-packet of the transport packet has a length of 20 bytes. S_LSP is set to '160' for transport packets #1 and #3 including an audio PES packet to indicate that the last sub-packet of the transport packet has a length of 160 bytes. The length of the last sub-packet is a value that varies depending on the length of the video PES packet and audio PES packet. The transport packet is split by a size of 256 bytes when the header and the optional header have a length of 8 bytes, the video PES packet has a length of 522 bytes, and a 1-byte secondary sync signal is inserted into the middle of the packet. Therefore, the transport packet is split into three sub-packets. The three sub-packets include: a sub-packet 1: header+optional header (8 bytes) and a video PES packet (248 bytes); a sub-packet 2: secondary sync signal (1 byte) and video PES packet (255 bytes); and a sub-packet 3: secondary sync signal (1 byte) and video PES packet (19 bytes). Accordingly, a last sub-packet has a length of 20 bytes. Similarly, a transport packet including an audio PES packet having a length of 407 bytes is split into two sub-packets. The two sub-packets include: a sub-packet 1: header+optional header (8 bytes) and an audio PES packet (248 bytes); and a sub-packet 2: secondary sync signal (1 byte) and audio PES packet (159 bytes). Accordingly, a last sub-packet has a length of 160 bytes.

AFC_ATP of the optional header is set to '01b' for all transport packets to indicate that the optional header is immediately followed by a payload without an adaptation field.

SPBM of the optional header is set to '000b' for transport packets #0 and #2 and is set to '00b' for transport packets #1 and #3 to indicate that each sub-packet included in the transport packet has no error. The number of bits of the SPBM is determined according to the number of sub-packets included in the transport packet.

'Stuffing bits' of the optional header is set to '000b' for transport packets #0 and #2 and is set to '0000b' for transport packets #1 and #3 to make a total length of the header and the optional header included in each transport packet a multiple of bytes.

CRC of the optional header is used for error detection of the full header included in each transport packet. A CRC-8 bit is added for a 7-byte size of the full header other than the sync signal. Herein, the CRC-8 code may be $X^8+X^7+X^6+X^4+X^2+1$.

Figure 6:
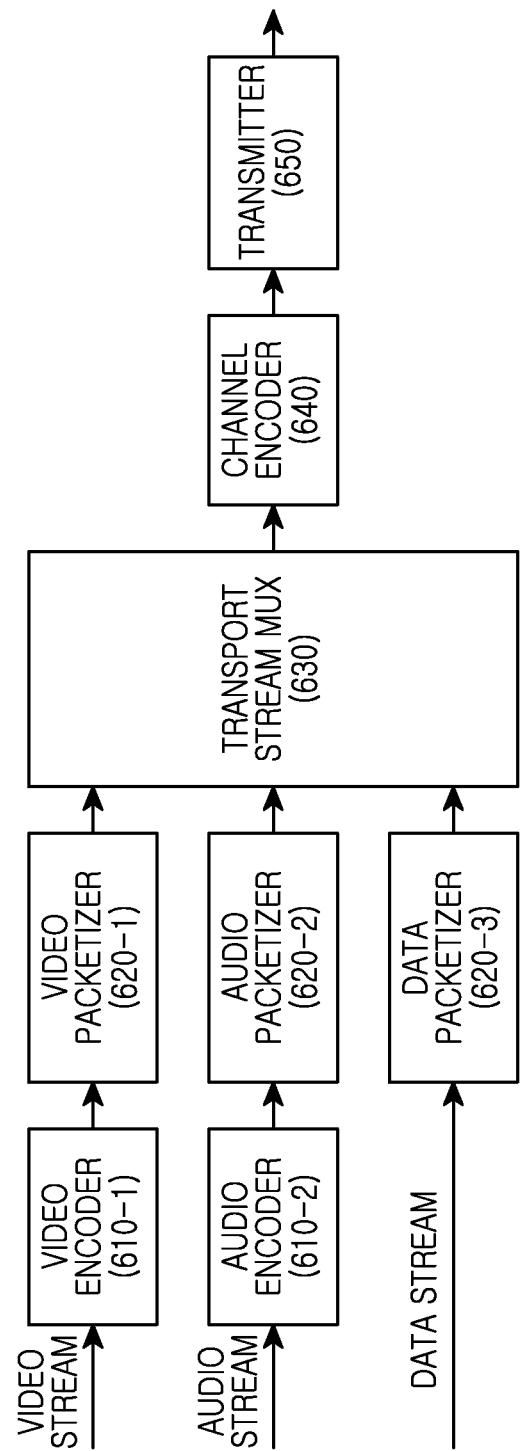
FIG. 6 is a block diagram illustrating a structure of a transmitter in an AV communication system, according to an embodiment of the present invention.

FIG. 6 is a block diagram illustrating a structure of a transmitter in an AV communication system, according to an embodiment of the present invention.

Referring to FIG. 6, the transmitter includes a video encoder 610-1, an audio encoder 610-2, a video packetizer 620-1, an audio packetizer 620-2, a data packetizer 620-3, a transport stream MUX 630, a channel encoder 640, and a transmitter 650.

The video encoder 610-1 compresses a video stream according to a specific video codec. The audio encoder 610-2 compresses an audio stream according to a specific audio codec. The video packetizer 620-1 generates video PES packets by splitting the compressed video stream according to a specific unit. The audio packetizer 620-2 generates audio PES packets by splitting the compressed audio stream according to a specific unit. Each of the PES packets includes a PES header. The PES header includes information (e.g., time stamp information) required to reproduce the audio stream and the video stream. The data packetizer 620-3 generates MPE stream packets by splitting the data stream according to a specific unit and by inserting a header thereto.

The transport stream MUX 630 selects a bit-stream of the video PES packets, the audio PES packets, and the MPE stream packets as a payload, and generates transport packets by inserting a transport packet header.

More specifically, the transport stream MUX 630 inserts a sync signal, a header, and an optional header into the transport packet according to aforementioned embodiments of the present invention. The transport stream MUX 630 first determines a range to be included in one transport packet of data for the first PES packets and the video PES packets, and then generates a header of a transport packet including a start sync signal. To generate a variable-length transport packet, the transport stream MUX 630 inserts the header described in Table 1 above, and additionally inserts the optional header described in Table 4 or Table 5 above.

The transport stream MUX 630 can set the AFC field of the header to '00' according to Table 3 above to indicate that the transport packet is the variable-length transport packet. As a result, the transport stream MUX 630 can be allowed to discard the transport packet when the conventional receiving apparatus receives the transport packet. In addition, the transport stream MUX 630 sets the TEI field of the header to '0' to avoid a situation in which the TEI field is set to '1', and thus, the conventional receiving apparatus recognizes the AFC field value '00' of the transport packet as an error.

As shown in Table 4 or Table 5 above, the transport stream MUX 630 inserts into each transmit packet an optional header including information that indicates a length of the transport packet and information required to decode the transport packet. Specifically, the transport stream MUX 630 inserts an optional header into a portion next to the transport packet. The optional header includes at least one of length information of the transport packet, information on an adaptation field/payload located next to the optional header, an order of the transport packet, a CRC checking status, an FEC success status, a length of the optional header, error information for each split region, and CRC information.

The transport stream MUX 630 can compare the length of the transport packet with a threshold length and thus can insert a secondary sync signal using the method described with respect to FIG. 3.

The channel encoder 640 performs channel encoding on transport packets. The transmitter 650 transmits the channel-encoded transport packets through a channel. The channel may be a wired channel or a wireless channel. In case of the wireless channel, the transmitter 650 generates complex-valued symbols by modulating a bit-stream of the transport packets, performs physical-layer processing according to a communication system protocol, up-converts the symbols into Radio Frequency (RF) signals, and then transmits the RF signals through an antenna.

Figure 7:
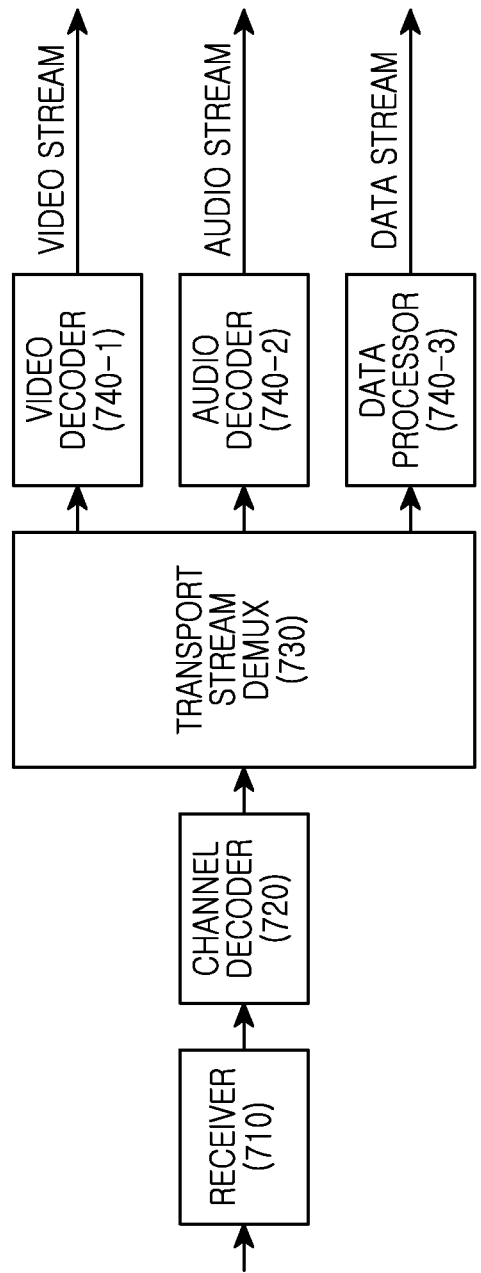
FIG. 7 is a block diagram illustrating a structure of a receiver in an AV communication system, according to an embodiment of the present invention.

FIG. 7 is a block diagram illustrating a structure of a receiver in an AV communication system, according to an embodiment of the present invention.

Referring to FIG. 7, the receiver includes a receiver 710, a channel decoder 720, a transport stream DEMUX 730, a video decoder 740-1, an audio decoder 740-2, and a data processor 740-3.

The receiver 710 restores channel-encoded transport packets from a signal received through a channel. The channel may be a wired channel or a wireless channel. In case of the wireless channel, the receiver 710 converts an RF signal received through an antenna into a baseband signal, performs physical-layer processing according to a communication system protocol, and restores a bit-stream by using demodulation.

The channel decoder 720 performs channel decoding on the channel-encoded transport packets, and provides a bit-stream of the transport packets to the transport stream DEMUX 730.

The transport stream DEMUX 730 acquires packet synchronization by using a sync signal from the transport packets, and extracts a video stream and an audio stream from the transport packet. In particular, according to an embodiment of the present invention, the transport stream DEMUX 730 detects a start sync signal from the transport packets, and analyzes a header located next to the start sync signal to determine whether the transport packet is a variable-length transport packet. If the AFC field value is set to '00' in the header configured as shown in Table 1 above, the transport stream DEMUX 730 determines that the transport packet is the variable-length packet. If the AFC field value is set to a value other than '00', the transport stream DEMUX 730 determines that the transport packet is the MPEG2-TS packet. If the transport packet is the MPEG2-TS packet, the transport stream DEMUX 730 operates in a conventional manner.

If the transport packet is determined to be the variable-length transport packet, the transport stream DEMUX 730 analyzes an optional header located next to the header to acquire at least one of length information of the transport packet, information on an adaptation field/payload located next to the optional header, an order of the transport packet, a CRC checking status, an FEC success status, a length of the optional header, error information for each split region, and CRC information. The optional header of the transport packet can be configured as shown in Table 4 or Table 5 above. Specifically, the transport stream DEMUX 730 can analyze the optional header configured as shown in Table 4 or Table 5 above to acquire the information that indicates the length of the transport packet, and then can determine a start position of a next transport packet. In addition, the transport stream DEMUX 730 determines whether the header has an error by using a CRC code included in the optional header. If the error is detected, the transport stream DEMUX 730 determines that information on the header and the optional header is unreliable, and thus, discards the transport packet.

Further, the transport stream DEMUX 730 can detect at least one sync signal for each transport packet from the transport packets. Since each of the transport packets must include a start sync signal and additionally can include a secondary sync signal, the transport stream DEMUX 730 can acquire a length of a sub-packet and a start position of a next transport packet based on information included in the optional header, and thus, can detect the start sync signal and the secondary sync signal. For example, upon detection of a pattern agreed as a sync signal from an input transport packet, the transport stream DEMUX 730 can acquire length information of sub-packets included in the transport packet by referring to a location at which the length information of the transport packet is stored from a position at which the sync signal is detected. The transport stream DEMUX 730 can detect a secondary sync signal by determining whether the sync signal exists at a start position of a next sub-packet based on the acquired length information of sub-packets. In addition, the transport stream DEMUX 730 can acquire a length of the transport packet by using the acquired length information of sub-packets. By using the acquired length, the transport stream DEMUX 730 can confirm a start position of a next transport packet to detect the start sync signal and can determine whether synchronization is matched between transport packets.

When performing sync signal detection as described above, the transport stream DEMUX 730 can determine that the sync signal detection is properly performed when at least four continuous sync signals are detected at an expected location to ensure reliability of the sync signal detection. When a sync signal has a size of 1 byte, a probability that the sync signal is detected at any one position is 1/256 and a probability that the pattern is detected at four continuous expected positions is $1/2^{32}$. Even if a pattern detected at the four continuous expected positions is determined as the sync signal, a probability of making a wrong decision is $1/2^{12}$ (=2.33E-10) which is very low.

Since embodiments of the present invention support both the variable-length transport packet and the MPEG2-TS packet, when the sync signal pattern is detected on a 188-byte basis from a position at which the sync signal pattern is first detected, it can be determined that a current transport packet is the MPEG2-TS packet. Each transport packet can be synchronized to determine an AFC field value included in a header of the transport packet, and thus, it can be reconfirmed that the transport packet is the MPEG2-TS packet.

The video decoder 740-1 restores a video stream by decompressing a video stream compressed according to a video compression codec used in a transmitter. The audio decoder 740-2 restores an audio stream by decompressing an audio stream compressed according to an audio compression codec used in the transmitter. The data processor 740-3 interprets a data stream, and performs a process corresponding to interpreted information.

Figure 8:
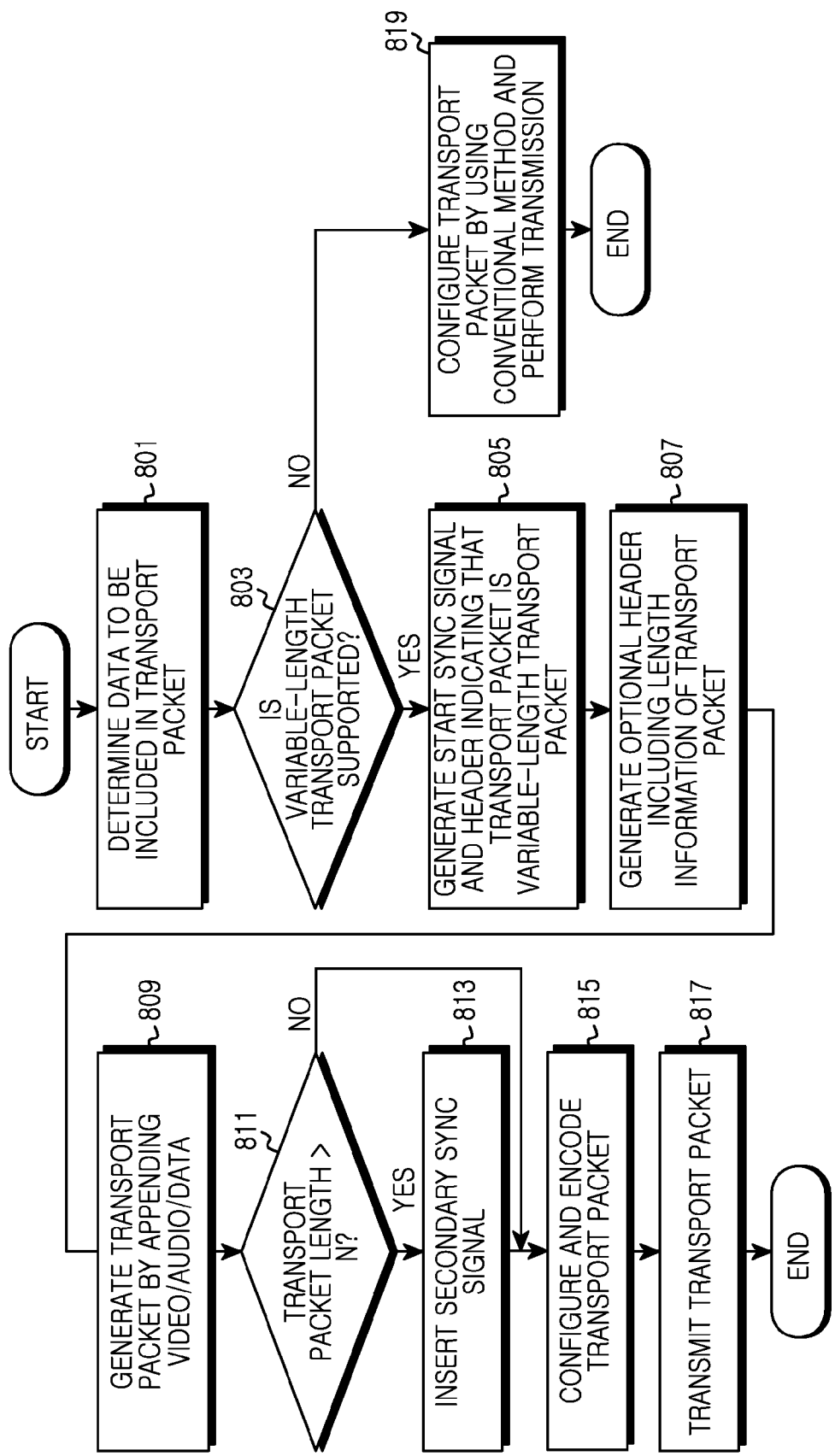
FIG. 8 is a flowchart illustrating an operation of a transmitter in an AV communication system, according to an embodiment of the present invention.

FIG. 8 is a flowchart illustrating an operation of a transmitter in an AV communication system, according to an embodiment of the present invention. The operation of FIG. 8 is a process of generating and transmitting a variable-length transport packet after generating an AV PES packet.

Referring to FIG. 8, the transmitter determines video PES packets or audio PES packets to be included in one transport packet in step 801. Specifically, the transmitter can select a packet to be transmitted from the audio PES packet and the video PES packet, and then can determine to transmit the selected PES packet as one transport packet.

In step 803, the transmitter determines whether a variable-length transport packet is supported. Specifically, the transmitter determines whether to generate the variable-length transport packet or the MPEG2-TS packet. If it is determined that the variable-length transport packet is not supported and the MPEG2-TS packet is generated, the transmitter configures a transport packet in a conventional manner and transmits a frame including the transport packet, in step 819, before terminating the methodology.

If it is determined that the variable-length transport packet is supported and the variable-length transport packet is generated, the transmitter generates a start sync signal having a pre-agreed pattern and a header indicating that the transport packet is a variable-length transport packet, in step 805. The start sync signal can be included in the header. Specifically, the transmitter generates a header including information shown in Table 1, and sets an AFC field to '00' and a TEI field to '0'.

In step 807, the transmitter generates an optional header including length information of the transport packet. Specifically, as shown in Table 4 or Table 5, the transmitter generates length information of the transport packet, information on an adaptation field/payload located next to the optional header, an order of the transport packet, a CRC checking status, an FEC success status, a length of the optional header, error information for each split region, and CRC information.

In step 809, the transmitter generates a transport packet by appending a video PES packet or an audio PES packet to the generated header and optional header.

After generating the transport packet, the transmitter determines whether a length of the transport packet exceeds a threshold length, in step 811. If the length of the transport packet is less than or equal to the threshold length, the methodology proceeds to step 815. If the length of the transport packet exceeds the threshold length, the methodology proceeds to step 813, where the transmitter inserts a secondary sync signal into the transport packet. The secondary sync signal can be inserted in accordance with the method of FIG. 3.

In step 815, the transmitter performs channel encoding on the transport packet. In step 817, the transmitter transmits the channel-encoded transport packet through a channel. The channel may be embodied as a wired channel or a wireless channel. In case of the wireless channel, the transmitter generates complex-valued symbols by modulating a bit-stream of the transport packets, performs physical-layer processing according to a communication system protocol, up-converts the symbols into RF signals, and then transmits the RF signals through an antenna.

Figure 9:
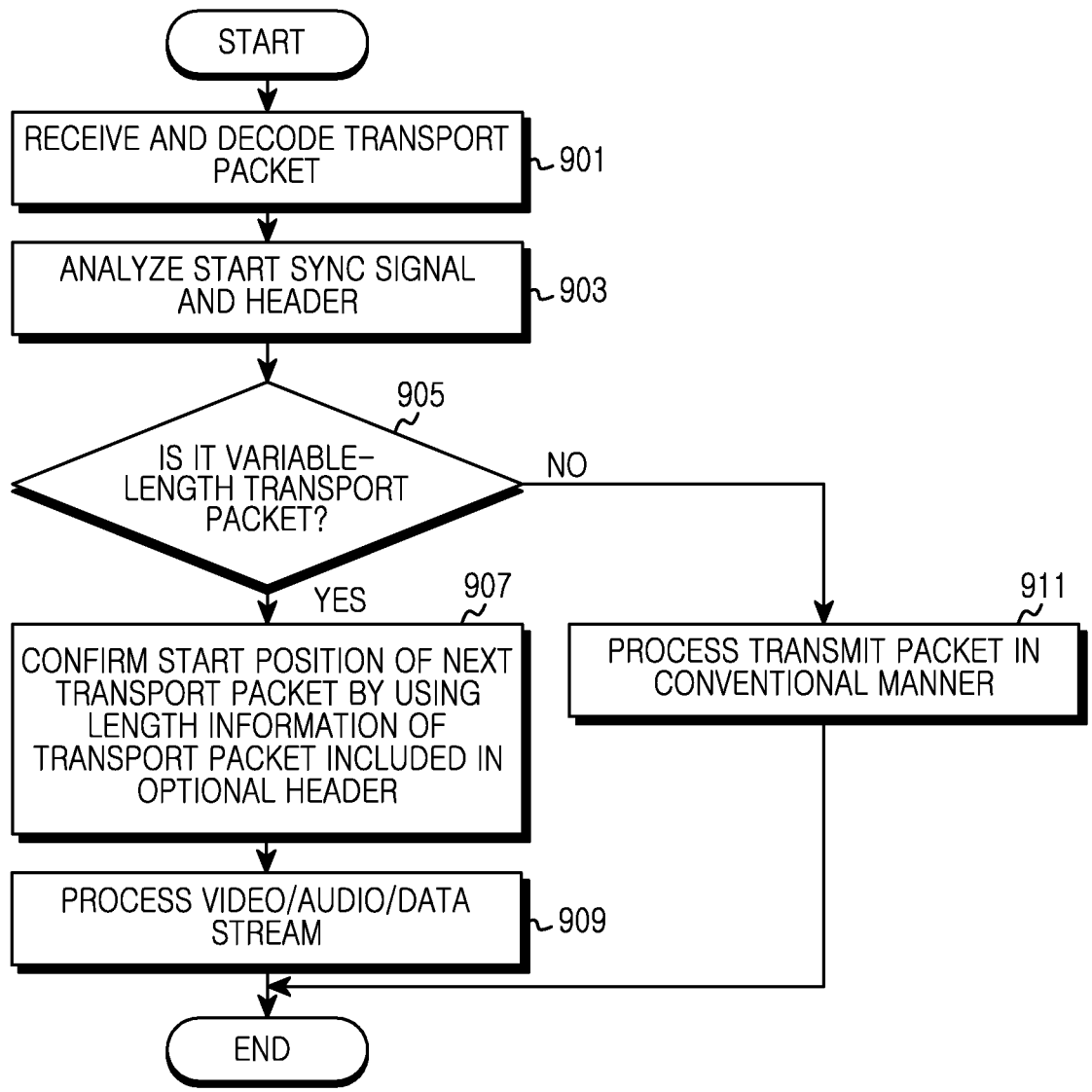
FIG. 9 is a flowchart illustrating an operation of a receiver in an AV communication system, according to an embodiment of the present invention.

FIG. 9 is a flowchart illustrating an operation of a receiver in an AV communication system, according to an embodiment of the present invention. The operation of FIG. 9 is a process of receiving continuous transport streams and interpreting a transport packet in the receiver.

Referring to FIG. 9, the receiver receives the transport packet and performs channel decoding in step 901, and then detects a start sync signal from the transport packet to analyze a header in step 903. Specifically, the receiver detects a sync signal that represents a start position of the transport packet, and thus, acquires synchronization of the transport packet. The receiver can then analyze the header of the transport packet, which is configured as shown in Table 1.

In step 905, the receiver determines whether the result acquired by analyzing the transport packet shows that the transport packet is a variable-length transport packet. If an AFC field value of the header acquired by the header analysis result is '00', the receiver determines that the transport packet is the variable-length transport packet. If the AFC field value of the header is not '00', the receiver determines that the transport packet is the MPEG2-TS packet. If the transport packet is the MPEG2-TS packet, the methodology proceeds to step 911, where the receiver processes the transport packet in a conventional manner, before terminating the methodology.

If the transport packet is the variable-length transport packet, the receiver acquires length information of the transport packet by analyzing an optional header located next to the header, and determines a start position of a next transport packet by using the acquired information, in step 907. Further, in order to process the transport packet, the receiver can acquire, from the optional header, information on at least one an adaptation field/payload, an order of the transport packet, a CRC checking status, an FEC success status, a length of the optional header, an error for each split region, and CRC. Furthermore, the receiver can determine a secondary sync signal included in the transport packet by using length information of sub-packets included in the optional header. The receiver can determine whether an error occurs in the transport packet by using error information included in the optional header, and can discard the transport packet at the occurrence of the error.

In step 909, the receiver extracts an audio/video/data stream from the transport packet, and processes the extracted stream. Since the data extracted from the transport packet is an audio/video PES packet or an MPE stream packet, the receiver extracts an audio/video/data stream from the audio/video PES packet or the MPE stream packet. The receiver processes and reproduces the audio/video stream according to a compression codec used in a transmitter, or performs a process based on information determined by analyzing the data stream.

Although the header and the optional header are separately described in embodiments of the present invention for purposes of clarity, the header and the optional header can also be configured as a single header.

According to embodiments of the present invention, an AV communication system supports a transport packet having a structure compatible with the MPEG2-TS packet. Therefore, a high-speed data transport service can be supported more effectively while also supporting the MPEG2-TS packet.

While the present invention has been shown and described with reference to certain embodiments thereof, it will be understood by those skilled in the art that various changes in form and detail may be made therein without departing from the spirit and scope of the present invention as defined by the appended claims.

What is claimed is:

1. A method for supporting a variable-length transport packet in a transmitter of an Audio/Video (AV) communication system, the method comprising the steps of:
   determining whether a transport packet is the variable-length transport packet;
   generating a header including an adaptation_field_control field indicating whether the transport packet is the variable-length transport packet;
   when the transport packet is the variable-length transport packet, generating an optional header including total length information of the transport packet, and transmitting the transport packet comprising the header and the optional header; and
   when the transport packet is not the variable-length transport packet, transmitting the transport packet including the header.

2. The method of claim 1, wherein, if a value of the adaptation_field_control field is '00', the adaptation field control field indicates that the transport packet is the variable-length transport packet, and if the value of the adaptation_field_control field is a value other than '00' the adaptation_field_control field indicates whether at least one of adaptation field and payload exists in the header of the transport packet.

3. The method of claim 2, wherein, when the variable-length transport packet is indicated by using the value of the adaptation_field_control field in the header, information that indicates whether the adaptation field/payload exists is included in the optional header, and a field that indicates a bit error status in the header is set to '0' irrespective of bit error of the transport packet.

4. The method of claim 1, wherein the optional header includes at least one of a number of sub-packets constituting the transport packet, length information of a last sub-packet constituting the transport packet, information indicating whether an adaptation field/payload exists, an order of the transport packet, a Cyclic Redundancy Check (CRC) checking status, a Forward Error Correction (FEC) success status, an error status of each sub-packet, and a stuffing bit for making a length of the transport packet a multiple of bytes.

5. The method of claim 1, wherein the header includes at least one of a sync signal that represents a start position of the transport packet, an error status indicating whether there are one or more bit errors in the transport packet, a start position of a payload, a priority of the transport packet, an IDentifier (ID) of the transport packet, information indicating whether the transport packet is scrambled, information indicating whether an adaptation field/payload exists, and an order of the transport packet.

6. A method for supporting a variable-length transport packet in a receiver of an Audio/Video (AV) communication system, the method comprising the steps of:
   receiving a transport packet from a transmitter;
   determining whether the transport packet is the variable-length transport packet by analyzing an adaptation_field_control field in a header of the transport packet;
   when the transport packet is the variable-length transport packet, acquiring total length information of the transport packet from an optional header in the transport packet; and
   extracting at least one of an audio stream, a video stream and a data stream from the transport packet.

7. The method of claim 6, wherein determining whether the transport packet is the variable-length transport packet comprises:
   determining a value of the adaptation_field_control field in the header of the transport packet;
   when the value of the adaptation_field_control field is '00', determining that the transport packet is the variable-length transport packet; and
   when the value of the adaptation_field_control field is not '00', determining that the transport packet is not the variable-length transport packet.

8. The method of claim 7, further comprising:
   when the variable-length transport packet is indicated by using the value of the adaptation_field_control field in the header, determining whether the adaptation field/payload exists by using the optional header; and
   determining whether an information field indicating a bit error status is set to '0' in the header.

9. The method of claim 6, wherein the optional header includes at least one of a number of sub-packets constituting the transport packet, length information of a last sub-packet constituting the transport packet, information indicating whether an adaptation field/payload exists, an order of the transport packet, a Cyclic Redundancy Check (CRC) checking status, a Forward Error Correction (FEC) success status, an error status of each sub-packet, and a stuffing bit for making a length of the transport packet a multiple of bytes.

10. The method of claim 6, wherein the header includes at least one of a sync signal that represents a start position of the transport packet, an error status indicating whether there are one or more bit errors in the transport packet, a start position of a payload, a priority of the transport packet, an IDentifier (ID) of the transport packet, information indicating whether the transport packet is scrambled, information indicating whether an adaptation field/payload exists of the transport packet, and an order of the transport packet.

11. An apparatus for supporting a variable-length transport packet in a transmitter of an Audio/Video (AV) communication system, the apparatus comprising:
   a multiplexer (MUX) for determining data to be transmitted, determining whether a transport packet is the variable-length transport packet, generating a header comprising an adaptation field control field indicating whether the transport packet is the variable-length transport packet, generating an optional header comprising total length information of the transport packet when the transport packet is the variable-length transport packet; and
   a transmitter for transmitting the transport packet comprising the header and the optional header when the transport packet is the variable-length transport packet, and transmitting the transport packet comprising the header when the transport packet is not the variable-length transport packet.

12. The apparatus of claim 11, wherein, if a value of the adaptation_field_control field is '00', the adaptation_field_control field indicates that the transport packet is the variable-length transport packet, and if the value of the adaptation_field_control field is a value other than '00', the adaptation_field_control field indicates whether at least one of adaptation field and payload exists in the header of the transport packet.

13. The apparatus of claim 12, wherein, when the variable-length transport packet is indicated by using the value of the adaptation_field_control field in the header, the MUX includes information that indicates whether the adaptation field/payload exists in the optional header, and sets a field that indicates a bit error status in the header to '0' irrespective of bit error of the transport packet.

14. The apparatus of claim 11, wherein the optional header includes at least one of a number of sub-packets constituting the transport packet, length information of a last sub-packet constituting the transport packet, information indicating whether an adaptation field/payload exists, an order of the transport packet, a Cyclic Redundancy Check (CRC) checking status, a Forward Error Correction (FEC) success status, an error status of each sub-packet, and a stuffing bit for making a length of the transport packet a multiple of bytes.

15. The apparatus of claim 11, wherein the header includes at least one of a sync signal that represents a start position of the transport packet, an error status indicating whether there are one or more bit errors in the transport packet, a start position of a payload, a priority of the transport packet, an IDentifier (ID) of the transport packet, information indicating whether the transport packet is scrambled, information indicating whether an adaptation field/payload exists, and an order of the transport packet.

16. An apparatus for supporting a variable-length transport packet in a receiver of an Audio/Video (AV) communication system, the apparatus comprising:
   a receiver for receiving a transport packet from a transmitter; and
   a demultiplexer (DEMUX) for determining whether the transport packet is the variable-length transport packet by analyzing an adaptation_field_control field in a header of the transport packet, acquiring total length information of the transport packet from an optional header included in the transport packet when the transport packet is the variable-length transport packet, and extracting at least one of an audio stream, a video stream and a data stream from the transport packet.

17. The apparatus of claim 16, wherein the DEMUX determines a value of the adaptation_field_control field in the header of the transport packet, determines that the transport packet is the variable-length transport packet when the value of the adaptation_field_control field is '00', and determines that the transport packet is not the variable-length transport packet when if the value of the adaptation_field_control field is not '00'.

18. The apparatus of claim 17, wherein, when the variable-length transport packet is indicated by using the value of the adaptation_field_control field in the header, the DEMUX determines whether the adaptation field/payload exists by using the optional header, and determines whether an information field indicating a bit error status is set to '0' in the header.

19. The apparatus of claim 16, wherein the optional header includes at least one of a number of sub-packets constituting the transport packet, length information of a last sub-packet constituting the transport packet, information indicating whether an adaptation field/payload exists, an order of the transport packet, a Cyclic Redundancy Check (CRC) checking status, a Forward Error Correction (FEC) success status, an error status of each sub-packet, and a stuffing bit for making a length of the transport packet a multiple of bytes.

20. The apparatus of claim 16, wherein the header includes at least one of a sync signal that represents a start position of the transport packet, an error status indicating whether there are one or more bit errors in the transport packet, a start position of a payload, a priority of the transport packet, an IDentifier (ID) of the transport packet, information indicating whether the transport packet is scrambled, information indicating whether an adaptation field/payload exists of the transport packet, and an order of the transport packet.

* * * * *